INVENTOR.
Claude M. Hines

United States Patent Office 3,061,381
Patented Oct. 30, 1962

3,061,381
COMPRESSOR SYNCHRONIZING SYSTEM FOR MULTI-UNIT LOCOMOTIVES HAVING ARRANGEMENT FOR EQUALIZING FLUID PRESSURE DEMAND FOR BRAKE CONTROL PURPOSES ON ALL UNITS
Claude M. Hines, Verona, Pa., assignor to Westinghouse Air Brake Company, Wilmerding, Pa., a corporation of Pennsylvania
Filed Mar. 17, 1961, Ser. No. 96,476
10 Claims. (Cl. 303—10)

This invention relates to compressor synchronizing systems and more particularly to a system for so controlling a plurality of synchronously operating compressors on a multiple-unit locomotive as to equalize the demand for brake control fluid pressure on all units, thereby to equalize the operating periods of the compressors on different units of the locomotive.

In railroad service, locomotives are often coupled together for multiple-unit locomotive operation, with propulsion and brake control of all locomotives in the unit being effected from the lead locomotive only. In such multiple-unit operation, a compressor governor synchronizing wire extends throughout all locomotives in the unit to electrically synchronize the operation of the compressors on each locomotive to operate to supply fluid under pressure to a common pipe, often referred to as the main reservoir equalizing pipe, said pipe serving to conduct fluid under pressure from the main reservoir on the lead locomotive to the brake valve on the lead locomotive for effecting control of the brakes. On each locomotive of the multiple-unit there is a choke of say $5/16''$ diameter inserted in the pipe leading from the main reservoir on that locomotive to the main reservoir equalizing pipe. This choke is provided to prevent the excessively rapid loss of main reservoir fluid pressure in the event of an accidental parting of the locomotives in the unit, in order to maintain a sufficient reserve of air pressure to effect a brake application. This choke, however, acts to restrict recharging of the main reservoir equalizing pipe after a brake application. During a brake application effected by operation of a brake valve on the lead locomotive, the main reservoir on the lead locomotive and the portion of the main reservoir equalizing pipe nearest the controlling brake valve on the lead locomotive supplies considerably more fluid under pressure therefrom than from the remaining main reservoirs and the more remote portions of the main reservoir equalizing pipe on the trailing locomotives. Due to the greater demand for fluid pressure on the lead locomotive, the compressor on said locomotive is required to supply more fluid under pressure (via the choked pipe thereon) to the main reservoir equalizing pipe than are the other compressors on the trailing locomotive. Since the compressors are all operating simultaneously due to the synchronizing wire, the aforementioned larger demand made on the compressor on the lead locomotive, simultaneously with a smaller demand on the remaining compressors, results in the reservoirs on the trailing locomotives being fully charged before the reservoir on the lead locomotive, which in turn results in the popping of safety valves on the reservoirs of the trailing locomotives and unnecessary work of said compressors, while the compressor on the lead locomotive is still attempting to recharge the reservoir thereon and the load portion of the main reservoir equalizing pipe.

According to this invention, there is provided an improved compressor governor control synchronizing system for a multiple-unit locomotive for equalizing the demand for brake control fluid pressure on all units. Essentially the improved arrangement includes a large capacity by-pass valve on each locomotive automatically controlled so as to by-pass the choke in the pipe between the main reservoir and the main reservoir equalizing pipe during the time that the governor synchronizing wire is energized by any one governor switch to effect compressor operation to supply fluid under pressure. By-passing of this choke permits rapid unrestricted flow of main reservoir fluid presure to the main reservoir equalizing pipe from all of the compressors to thereby equalize the work load of each compressor while also reducing the total work load by reducing the waste of fluid under pressure by way of popping safety valves on the reservoirs of the trailing locomotives.

In the accompanying drawings, FIG. 1 is a diagrammatic view of a multiple-unit locomotive compressor synchronizing apparatus embodying the improved arrangement of the present invention for equalizing demand on the several compressors of the unit.

Description

Figure 1:
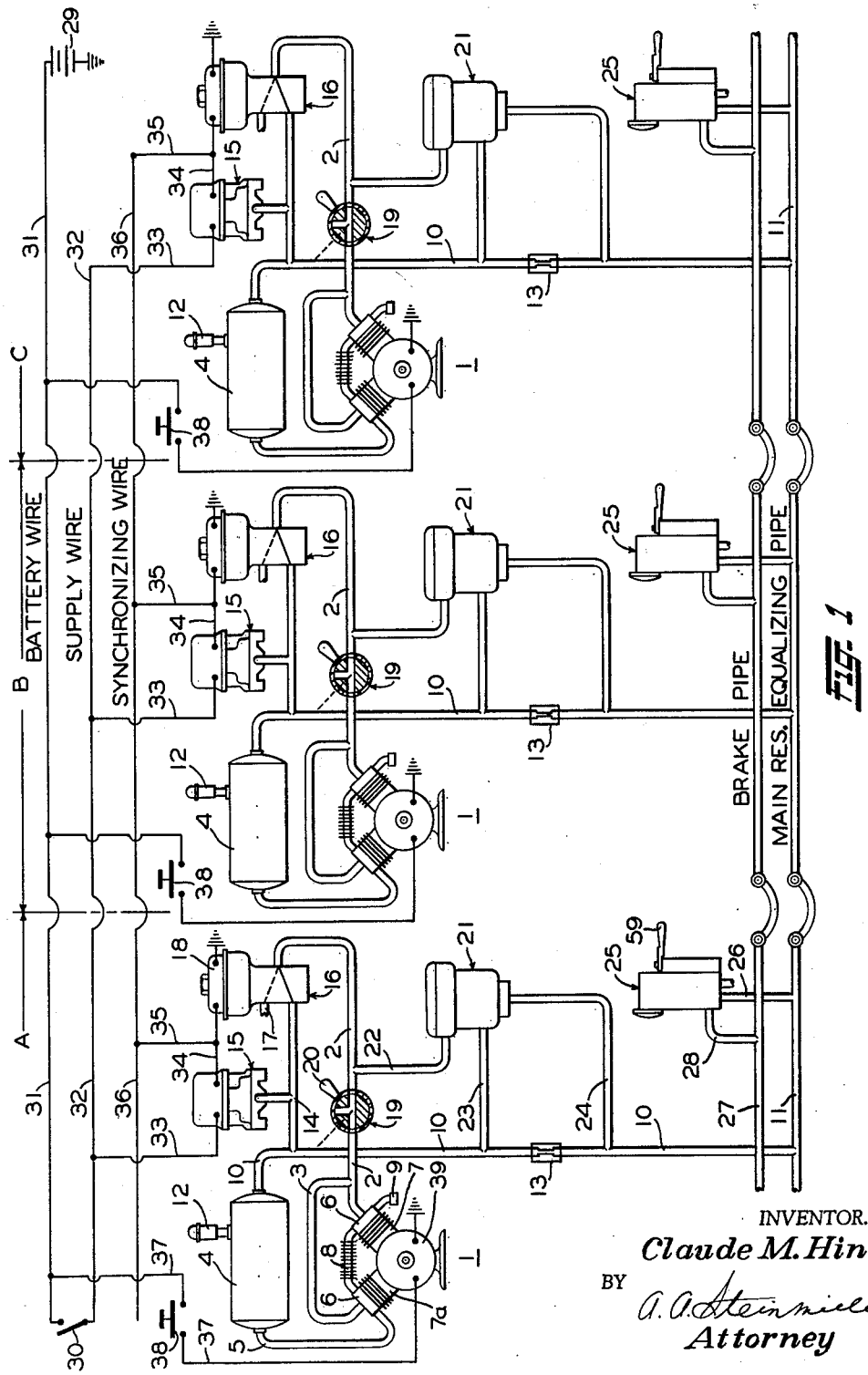

Referring to FIG. 1, the multiple-unit ocomotive compressor synchronizing system is shown in connection with three separate locomotive units A, B and C which are coupled together as a unit and interconnected by appropriate piping and wires. For purposes of description, the left-hand unit, unit A, is referred to hereinafter as the lead locomotive, and units B and C as trailing locomotives.

The apparatus on each locomotive is similar to that on the others, and, therefore, the same reference numerals are applied to corresponding devices on the several locomotives, it being understood that the description of the apparatus on one locomotive thus applies to all locomotives.

The equipment of each locomotive shown in FIG. 1 includes a compressor unit 1 operably loaded or unloaded responsive to fluid pressure in an unloader control pipe 2 and branch pipe 3 to supply fluid under pressure to a main reservoir 4 via an output pipe 5. An unloader 6 is shown as the top portion of the two compressor cylinders 7 and 7a with intercooler 8 connected between the two cylinders. An intake pipe and filter 9 is located on the cylinder 7 with the output pipe 5 on the cylinder 7a. The main reservoir 4 supplies fluid under pressure via a main reservoir pipe 10 to the main reservoir equalizing pipe 11 extending throughout the multiple unit. A safety valve 12 is located on each main reservoir 4 and is subject to the fluid pressure therein to vent the main reservoir at high unsafe pressures in a usual manner.

A choke 13, usually a $5/16''$ diameter choke, is inserted in the pipe 10 on each locomotive to prevent excessive and rapid loss of fluid under pressure from the main reservoir 4 on the coresponding locomotive in the event of rupture or leakage in the main reservoir equalizing pipe 11.

A branch pipe 14 connects a governor switch device 15 and a magnet valve 16 to the main reservoir pipe 10. The unloader control pipe 2 is also connected to the magnet valve 16 to be connected to atmosphere (indicated by a dotted line) at a port 17 when the winding 18 of the magnet valve 16 is energized as described hereinafter, or connected to the branch pipe 14 and main reservoir pipe 10 (by a communication shown as a solid line) when the winding 18 of the magnet valve 16 is deenergized. A manually operated vent valve 19 is connected in the unloader pipe 2 near the unloader 6, such that a handle 20 thereon may be positioned (as shown)

for normal operation permitting flow of fluid therethrough, or positioned in a venting position (shown by a dotted line) whereby the unloader 6 is vented to atmosphere and fluid pressure maintained in the portion of the unloader pipe 2 located to the right (as shown herein) of said vent valve 19. This vent valve is necessary to load the compressors manually in the event the governors or connected circuitry fails as will be understood hereinafter.

A by-pass valve 21, operatively controlled by fluid under pressure supplied via a pipe 22 responsively to fluid under pressure in the unloader control pipe 2, is connected by pipes 23 and 24 in a manner to by-pass the choke 13, as hereinafter more fully described.

An ouperator's brake valve 25 is also furnished on each locomotive, it being understood, however, that only the brake valve 25 on the lead locomotive is utilized. Fluid under pressure is supplied to the brake valve 25 from the main reservoir equalizing pipe 11 by way of a pipe 26, and the brake valve is operative in a well-known manner to control the supply of fluid under pressure to and release of fluid under pressure from the usual brake pipe 27 by way of pipe 28.

A battery 29 is located on the last trailing locomotive of the multiple unit and is connected to one side of a manually operated switch 30 on the lead locomotive by a battery wire 31 extending through the several locomotives of the unit such that if the locomotives are accidentally separated, the wire 31 will be broken to interrupt the synchronized operation of the compressors hereinafter described.

Connected to the opposite side of the switch 30 is the supply wire 32 which also extends through the several locomotives of the unit, with each locomotive compressor governor switch 15 having one terminal thereof connected by a wire 33 to the wire 32. The other terminal of the governor switch 15 is connected by a jumper wire 34 to one terminal of the winding 18 of the magnet valve 16 and also by a wire 35 to a governor synchronizing wire 36 extending through the locomotives to the remaining governor switches 15 and magnet valves 16 such that operation of same on each locomotive is synchronized.

A wire 37 connects the battery wire 31 via a manual switch 38 (manually closed) to the motor 39 of the compressor 1 to operate the compressor continuously whether loaded or unloaded, as described hereinafter.

Figure 2:
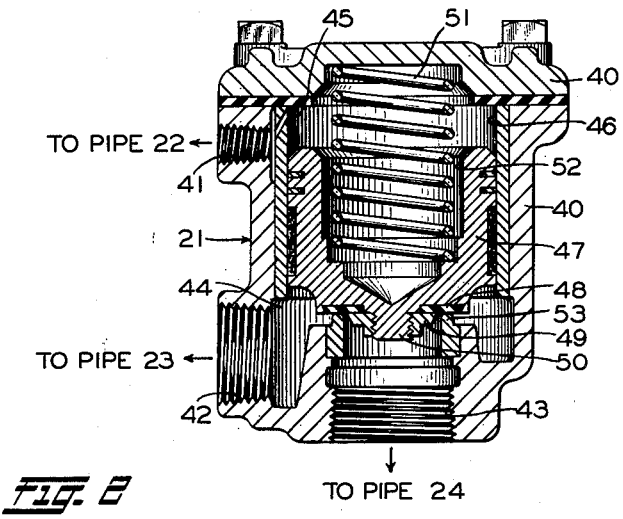
FIG. 2 is an enlarged sectionalized view of the by-pass valve used in the multiple-unit locomotive apparatus shown in FIG. 1.

The by-pass valve 21, as shown in detail in FIG. 2, comprises a casing 40 having three passages 41, 42 and 43 adapted to receive the pipes 22, 23 and 24, respectively. Two chambers 44 and 45 are formed in a bore 46 within said casing on opposite sides respectively of a valve operating piston 47 slidably operable within the bore 46. A valve ring 48 is fitted in one face of the piston and secured in place, as by a nut 49 threaded onto a stem 50 protruding from the said face of the piston. A spring 51 is located in chamber 45 between the casing 40 and a recess 52 in the other face of the piston 47 in a manner to bias the piston 47 and the valve ring 48 toward a valve seat ring 53 surrounding the passage 43 to seat thereon and cut off communication between passage 43 and chamber 44 for reasons hereinafter described.

Figure 3:
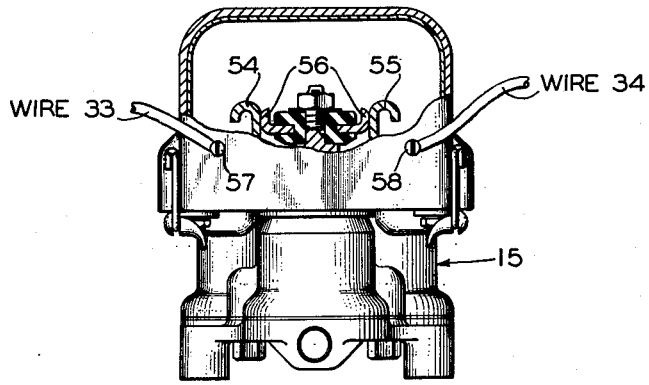
FIG. 3 is an enlarged outline view, partly in section, of the compressor governor switch utilized in the system of FIG. 1.

The compressor governor switch device 15 is of the usual type used in railroad apparatus, similar to that disclosed in U.S. Patent 1,615,365 (assigned to the assignee of the present application). The governor switch device 15 is shown in FIG. 1 and FIG. 3, FIG. 3 being partly in section to show the stationary switch contact members 54 and 55, and the circular movable contact member 56 for connecting the two stationary contact members responsively to fluid pressure reductions below a predetermined fluid pressure described hereinafter. A terminal post 57 is shown in FIG. 3 which is internally connected to the contact member 54 and connected to wire 33 externally. A terminal post 58 is internally connected to the contact member 55 and externally connected to wire 34.

Operation

In order to follow the succession of operations of the present apparatus, it should be assumed that the equipment is in the usual normal running condition with the handle 59 of the brake valve 25 in its "running" position; the main reservoir 4 and main reservoir equalizing pipe 11 fully charged, the switches 30 and 38 closed, governor switch contacts 54 and 55 disconnected and the winding 18 of magnet valve 16 deenergized to permit charging of the unloader pipe 2 to render the compressors 1 running but unloaded.

Under normal running conditions the main reservoir on each locomotive supplies fluid under pressure via pipes 10, 14 and a passage (shown as a solid line) in the magnet valve 16 to the unloader pipe 2 and pipe 22 to the chamber 45 of the by-pass valve 21. With fluid under pressure in chamber 45, the combined forces exerted on the valve operating piston 47 by said fluid pressure and the spring 51 is sufficient to overcome the fluid pressure in chamber 44 (connected to main reservoir via pipes 24 and 10) to thereby seat the valve ring 48 on the valve seat ring 53 and cut off the by-pass communication between pipes 23 and 24. It can thus be seen that under normal running conditions the only communication between the main reservoir 4 on each locomotive and the main reservoir equalizing pipe 11 is via the choke 13 in the pipe 19, as is desired for reasons previously discussed.

When it is desired to make a brake application, the handle 59 of the brake valve 25 on the lead locomotive is positioned in the usual application zone in a manner common to braking equipment. With a brake application being effected, the usual well-known control valve and associated devices (not shown) operate to apply the brakes on all locomotives of the unit in a well-known manner, not shown or described herein, with the main reservoir equalizing pipe 11 being utilized as a source of supply for the brake control valves and devices on the lead locomotive. In view of this, it can be understood that the largest demand for fluid under pressure is going to be from the main reservoir on the lead locomotive and the leading portion of the main reservoir equalizing pipe.

When the fluid under pressure in the main reservoir equalizing pipe and the main reservoir reduces below a predetermined low pressure of say 140 p.s.i., the governor switch device 15 operates in a well-known manner in response to the pressure reduction to connect switch contact members 54 and 55 by the contact member 56 to complete a circuit for energizing the winding 18 of the magnet valve 16. This circuit can be traced from the battery 29, via battery wire 31, closed switch 30, supply wire 32, wire 33 to the contact members 54, 55 and 56 of the governor switch 15, and wire 34 to the winding 18 of the magnet valve 16 and thence to ground.

Energization of the winding 18 of the magnet valve 15 causes the magnet valve to be operated to interrupt the communication (solid line) therethrough for supplying main reservoir pressure to the unloader control pipe 2, and establishes communication (dotted line) between unloader control pipe 2 and atmospheric port 17 to vent the unloader pipe. Venting the unloader control pipe 2 also vents branch pipe 3 and pipe 22. With the unloader control pipe 2 and branch pipe 3 vented, the unloaders 6 on the compressor unit 1 function in a well-known manner to load the compressor such that compressor operation is effective to supply fluid under pressure to the main reservoir 4 via pipe 5.

Wire 35 being connected to jumper wire 34 is simultaneously energized to thereby energize the governor synchronizing wire 36 extending through the several locomotives of the multiple unit to energize all the magnet windings 18 on the trailing locomotives by way of wire 36 and the connecting wires 35. This synchronized energization insures that when any one compressor unit 1 is loaded, all the compressor units are simultaneously loaded.

With the unloader control pipe 2 vented to atmosphere as heretofore described, the connecting pipe 22 and chamber 45 of the by-pass valve 21 are also vented to atmosphere. With chamber 45 vented to atmosphere, the main reservoir pressure supplied to chamber 44 via pipe 23 is sufficient to overcome the seating pressure of the spring 51 to thereby raise the valve operating piston 47 off the valve seat ring 53 and thereby establish a direct communication between the main reservoir 4 and main reservoir equalizing pipe 11 via pipes 10 and 23, chamber 44 and pipes 24 and 10 in a manner to by-pass the choke 13.

It can thus be seen that with the choke 13 by-passed on each locomotive, the replenishment of fluid under pressure to any location in the multiple unit fluid pressure system is accomplished rapidly with the work load of each compressor unit being evenly distributed.

When the compressor unit 1 has increased the pressure in the main reservoir to a predetermined high pressure of say 150 p.s.i., the governor switch 15 functions in a usual manner to move the contact member 56 out of engagement with the contact members 54 and 55 to thereby interrupt the energizing circuit for the winding 18 of the magnet valve 16 and the governor synchronizing line 36. With the energizing circuit interrupted, the compressor is again unloaded, in that the magnet valve 16 repositions in a manner to interrupt venting of the unloader control pipe 2 and establish a supply of main reservoir pressure thereto to operate the unloader 6 in a well-known manner to unload the compressor. Simultaneously, main reservoir pressure is supplied to pipe 22 and chamber 45 of the by-pass valve 21 where the combined pressure of the fluid therein and the pressure of spring 51 is sufficient to overcome the main reservoir pressure in chamber 44 to thereby cause the valve operating piston 47 to be seated on the valve seat ring 53. With the valve operating piston 47 seated as described, the communication previously described for by-passing the choke 13 is interrupted such that the only communication between the main reservoir 4 and the main reservoir equalizing pipe 11 is via the pipe 10 and the choke 13.

It can thus be seen that the protection afforded by the choke 13 during accidental parting is maintained in the apparatus with the exception of the brief time intervals in which it is necessary to charge the fluid pressure system at a rapid rate with the work load of the compressors evenly distributed, at which time by-pass of the choke is automatically effected. Should accidental parting of the locomotives occur during this just-mentioned brief time interval, the wires 31, 32 and 33 would necessarily be parted to immediately deenergize the magnet windings 18 of all the magnet valves 16 to thereby permit main reservoir fluid pressure to flow rapidly via pipes 10, 14, a passage in deenergized magnet valve 16 (shown solid), unloader pipe 2 and pipe 22 to the chamber 45 of the by-pass valves 21 to immediately close the by-pass communication and restore the described protective choked communication as desired. It can thus be seen that the protection afforded by the choke 13 is always present during accidental parting.

Having now described the invention, what I claim as new and desire to secure by Letters Patent, is:

1. For use in a multiple compressor system of the type comprising a plurality of compressors respectively charging a plurality of reservoirs communicating at spaced intervals with a common supply pipe supplied with fluid under pressure from said reservoirs, the combination of a plurality of choke means interposed respectively in a communication between each of said reservoirs and said common supply pipe for restricting the rate of flow of fluid under pressure from said reservoirs to said common supply pipe, and a plurality of valve means connected respectively in by-pass of a corresponding choke means and being operably controlled in accordance with operation of said compressors for providing unrestricted communication between said reservoirs and said common supply pipe only while said compressors are operating under loaded conditions.

2. For use in a multiple compressor system of the type comprising a plurality of compressors respectively charging a plurality of reservoirs communicating at spaced intervals with a common supply pipe supplied with fluid under pressure from said reservoirs, the combination of a plurality of choke means interposed respectively in a communication between each of said reservoirs and said common supply pipe for restricting the rate of flow of fluid under pressure from said reservoirs to said common supply pipe, and a plurality of valve means connected respectively in by-pass of a corresponding choke means and being operably controlled in accordance with operation of said compressors for providing restricted communication between said reservoirs and said common supply pipe via said choke means while said compressors are operating under unloaded conditions and providing unrestricted communication between said reservoirs and said common supply pipe while said compressors are operating under loaded conditions.

3. For use in a multiple compressor system of the type comprising a plurality of compressors respectively charging a plurality of reservoirs communicating at spaced intervals with a common supply pipe supplied with fluid under pressure from said reservoirs, the combination of a plurality of choke means interposed respectively in a communication between each of said reservoirs and said common supply pipe for restricting the rate of flow of fluid under pressure from said reservoirs to said common supply pipe, a plurality of valve means connected respectively in by-pass of a corresponding choke means and effective only when open to provide unrestricted flow of fluid under pressure between said reservoirs and said common supply pipe, governor means for each compressor operatively responsive to reduction of the pressure in the corresponding reservoir to a certain low pressure for effecting the loading of the compressor and operatively responsive to an increase of the pressure in the corresponding reservoir to a certain pressure higher than said low pressure for effecting the unloading of the compressor, synchronizing means associating all of said governor means so that operation of any one governor means to effect loading of the corresponding compressor also and concurrently effects loading of the other compressors, each of said governor means also being effective upon operation to load the corresponding compressor to effect operation of the corresponding said valve means to its open position.

4. The combination as set forth in claim 3 further characterized by each of said governor means being also effective upon operation to unload the corresponding compressor to effect operation of the corresponding said valve means to its closed position.

5. For use in a multiple compressor system of the type comprising a plurality of compressors respectively charging a plurality of reservoirs communicating at spaced intervals with a common supply pipe supplied with fluid under pressure from said reservoirs, the combination of a plurality of choke means interposed respectively in a communication between each of said reservoirs and said common supply pipe for restricting the rate of flow of fluid under pressure from said reservoirs to said common supply pipe, governor switch means for each compressor operative responsively to a certain low pressure in the respective reservoir to a closed position for effecting loading of the corresponding compressor and responsively to an increase of the pressure in the corresponding reservoir to a certain pressure higher than said low pressure to an open position for effecting unloading of the compressor, and a plurality of valve means connected respectively in by-pass of a corresponding choke means and operative, responsively to closing of any one of said governor switch means, from a closed position to an open position to provide unrestricted flow of fluid under pressure between said reservoirs and the common supply pipe.

6. The combination set forth in claim 5, further characterized by synchronizing means effective when any one of said governor switch means is operated to closed position to effect operation of all of said valve means from a closed to an open position notwithstanding that the corresponding governor switch means for each respective compressor is not operated to its closed position.

7. The combination set forth in claim 5, further characterized by a plurality of magnet valve means controlled respectively by said governor switch means, said magnet valve means respectively controlling loading and unloading of corresponding compressors and operation of the corresponding said valve means.

8. For use in a multiple compressor system of the type comprising a plurality of compressors respectively charging a plurality of reservoirs communicating at spaced intervals with a common supply pipe supplied with fluid under pressure from said reservoirs, the combination of a plurality of choke means interposed respectively in a communication between each of said reservoirs and said common supply pipe for restricting the rate of flow of fluid under pressure from said reservoirs to said common supply pipe, a plurality of control pipe means, fluid pressure operated unloader means operably responsive to supply of fluid pressure to said control pipe means to unload each of said compressors and operably responsive to venting of fluid pressure from said control pipe means to load said compressors, a plurality of governor means operably responsive to a reduction of the pressure in a corresponding reservoir to a certain low pressure to effect venting of said control pipe means and operably responsive to increase of the pressure in the corresponding reservoir to a certain pressure higher than said low pressure to effect the supply of fluid under pressure from said reservoirs to said control pipe means, and a plurality of valve means connected respectively in by-pass of a corresponding choke means and being operated responsively to venting of fluid pressure from said control pipe from a closed position to a position to provide unrestricted communication between said reservoirs and said common supply pipe while said compressors operate under loaded conditions.

9. For use in a multiple compressor system of the type comprising a plurality of compressors respectively charging a plurality of reservoirs communicating at spaced intervals with a common supply pipe supplied with fluid under pressure from said reservoirs, the combination of a plurality of choke means interposed respectively in a communication between each of said reservoirs and said common supply pipe for restricting the rate of flow of fluid under pressure from said reservoirs to said common supply pipe, a plurality of control pipe means adapted to be supplied with fluid under pressure, fluid pressure operated unloader means operably responsive to supply of fluid pressure to said control pipe means to unload each of said compressors and operably responsive to venting of fluid pressure from said control pipe means to load said compressors, a source of electrical energy, a plurality of magnet valve means operably responsive to energization thereof from said source to effect venting of said control pipe means and operably responsive to deenergization thereof to effect supply of fluid under pressure from said reservoirs to said control pipe means, a plurality of valve means connected respectively in by-pass of a corresponding choke means and being operated responsively to venting of fluid pressure from said control pipe from a closed to an open position to provide unrestricted communication between said reservoirs and said common supply pipe only while said compressors are operating under loaded conditions, and synchronizing wire means associating all of said magnet valve means so that energization of any one of said magnet valve means concurrently effects energization of all of said magnet valve means simultaneously to effect control of fluid pressure in each of said control pipes in a synchronized manner.

10. For use in a railroad locomotive multiple compressor system of the type comprising a plurality of compressors respectively charging a plurality of reservoirs communicating at spaced intervals with a common supply pipe supplied with fluid under pressure from said reservoirs, the combination of a plurality of choke means interposed respectively in a communication between each of said reservoirs and said common supply pipe for restricting the rate of flow of fluid under pressure from said reservoirs to said common supply pipe, brake pipe means responsive to supply of fluid under pressure thereto and venting of fluid under pressure therefrom to effect control of the release and application respectively of the brakes on the locomotive, brake valve means manually operative to effect supply of fluid under pressure from said supply pipe to said brake pipe and to release fluid under pressure from said brake pipe to effect brake control, a plurality of valve means connected respectively in by-pass of a corresponding choke means and being operably controlled in accordance with operation of said compressors for providing unrestricted communication between said reservoirs and said common supply pipe while said compressors are operating under loaded conditions.

References Cited in the file of this patent

UNITED STATES PATENTS

| | | |
|---|---|---|
| 2,652,189 | Gorman | Sept. 15, 1953 |
| 2,715,049 | Hines | Aug. 9, 1955 |